United States Patent [19]

Antoszewski

[11] 4,044,202
[45] Aug. 23, 1977

[54] PLURAL FREQUENCY SIGNALLING SYSTEMS

[75] Inventor: Eugeniusz Antoszewski, Stafford, England

[73] Assignee: The General Electric Company Limited, London, England

[21] Appl. No.: 644,570

[22] Filed: Dec. 29, 1975

[30] Foreign Application Priority Data

Jan. 21, 1975 United Kingdom ............... 2571/75

[51] Int. Cl.$^2$ ............................................. H04L 27/14
[52] U.S. Cl. ......................................... 178/88; 325/320
[58] Field of Search ........................... 178/88; 325/320; 340/171; 329/128

[56] References Cited
U.S. PATENT DOCUMENTS 3,233,181  2/1966  Calfee ..................................... 178/88
3,348,153  10/1967  Featherston ............................ 325/320

Primary Examiner—Richard Murray
Attorney, Agent, or Firm—Kirschstein, Kirschstein, Ottinger & Frank

[57] ABSTRACT

A receiver for use in a signalling system of the kind in which data is conveyed by transmitting a signal having alternately first and second frequencies. The receiver has circuitry for providing in response to the received signal two trains of pulses with frequencies corresponding to that of the received signal. The trains of pulses are fed to delay and coincidence detecting circuits which are so arranged that a first coincidence gate circuit produces an output only when the received signal has its first frequency and a second coincidence gate circuit produces an output only when the received signal has its second frequency.

11 Claims, 2 Drawing Figures

PLURAL FREQUENCY SIGNALLING SYSTEMS

This invention relates to plural frequency signalling systems employing frequency shift modulation techniques, i.e. systems in which data is conveyed by transmitting in sequence signals of different frequencies.

According to the present invention a receiver for use in a signalling system of the kind wherein data is conveyed by transmitting a signal having alternately first and second frequencies comprises: shaping and squaring circuitry for providing in response to the received signal first and second trains of pulses, the two trains having frequencies correspondingly dependent on the frequency of the received signal and the durations of the pulses in each train being small compared with the period of the received signal; a first delay circuit fed with one of said trains of pulses; a second delay circuit fed with one of said trains of pulses; a first coincidence gate circuit having as inputs the output of the first delay circuit and one of said trains of pulses; and a second coincidence gate circuit having as inputs the output of said second delay circuit and the other of said trains of pulses; the delays of the delay circuits being such that the first gate circuit produces an output substantially only when the received signal has its first frequency; and the second gate circuit produces an output substantially only when the received signal has its second frequency.

It will be appreciated that in a receiver according to the invention an output is produced by the first or the second gate according to whether the received signal has its first or second frequency; the receiver is thus capable of recognising the presence of the first and second frequencies in the received signal. The recognition band width of the first frequency is dependent on the duration of the pulses in said one train and independent of the duration of the pulses in the other train; similarly the recognition band width of the second frequency is dependent on the width of the pulses in the other train and independent of the duration of the pulses in said other train. Thus a receiver in accordance with the invention has the advantage that the recognition band widths of the first and second signals may be chosen independently.

In a receiver in accordance with the invention the pulses constituting one of said first and second trains of pulses normally have a greater duration than those pulses constituting the other train of pulses.

To improve performance in the presence of noise at least one of the delay circuits may comprise first and second component delay circuits connected via an intermediate coincidence gate circuit, the first component delay circuit being fed with one of said trains of pulses, the intermediate gating circuit having as inputs the output of said first component delay circuit and one of said trains of pulses, and the second component delay circuit being fed with the output of said intermediate gate circuit, the output of the second component delay circuit constituting the output of the delay circuit as a whole.

One or more of the delay circuits suitably comprises a monostable circuit arranged to be triggered to its unstable state by the pulses fed to it; and a shaping circuit which produces an output pulse in response to the monostable returning to its stable state. Thus each pulse triggering a monostable circuit produces a corresponding pulse delayed by the period of the monostable circuit.

With such delay circuits, the pulses of the trains of pulses are preferably arranged to be non-coincident, and, in respect of each delay circuit, the train of pulses used to trigger the monostable circuit of that delay circuit is different from the train of pulses applied to the coincidence gate circuit whose other input is derived from the output of that delay circuit. By this means the likelihood of a monostable circuit being triggered at the same time as it returns to its stable state is avoided.

Each of the two trains of pulses is conveniently produced by means of a monostable circuit. For non-coincident pulse trains the first train of pulses is suitably produced by a first monostable circuit triggered by the received signal, and the second train of pulses by a second monostable circuit triggered by the trailing edges of the pulses of the first train of pulses.

One receiver in accordance with the invention will now be described by way of example with reference to the drawings accompanying the Provisional Specification in which.

Figure 1:
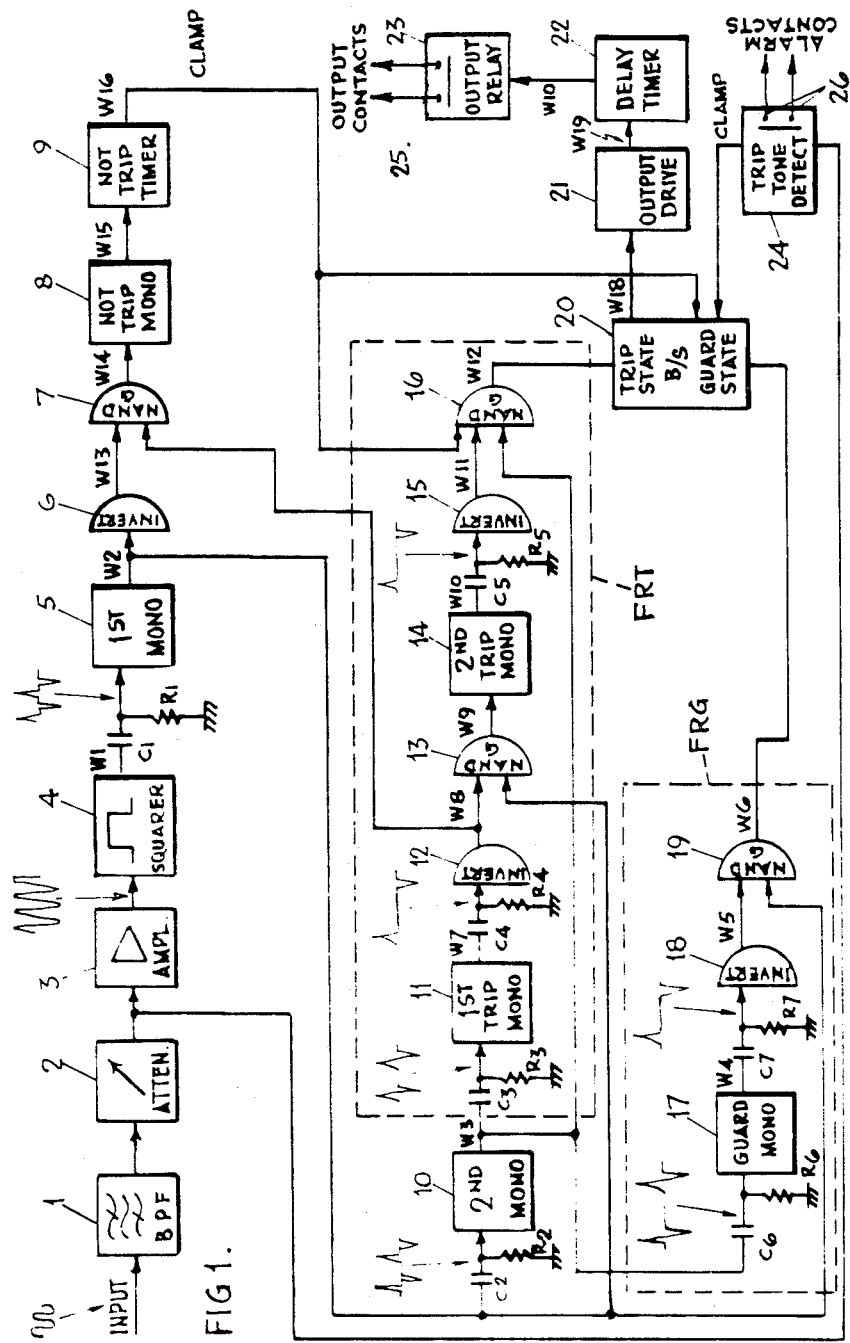
FIG. 1 is a block diagram of the receiver.

The receiver is intended for use in a multichannel data transmission system. The system may, for example, employ seven channels having centre frequencies ranging from 600 Hz to 3480 Hz with 480 Hz spacing between them so that the first channel has a centre frequency of 600 Hz, the second channel a centre frequency of 1080 Hz and so on.

The system employs a separate transmitter and a separate receiver for each channel the transmitters being connected to their associated receivers via a common two-wire transmission line such as a pair of telephone lines. In each channel data is conveyed by transmitting a carrier wave of sinusoidal form whose frequency is changed in accordance with the data to be transmitted between values 100 Hz above and 100 Hz below the channel centre frequency.

The particular receiver to be described is intended for use in an electric power transmission line protective relaying system. In such an application the lower carrier frequency is normally transmitted in a channel when the power line is fault free and the higher carrier frequency is transmitted when a fault occurs on the power line. When a fault occurs a circuit breaker associated with the power line is normally required to be tripped and the higher carrier frequency is therefore conventionally, and hereinafter, referred to as the trip frequency. Similarly, when the power line is fault-free it is desirable to guard against the operation of the circuit breaker and the lower carrier frequency is therefore conventionally, and hereinafter, referred to as the guard frequency.

Referring to the drawings, in the receiver the received signal (R in FIG. 2) is applied to a filter 1 having a band-pass characteristic shaped to select signals having frequencies within the channel for which the receiver is intended, to provide impedance matching of the receiver to the transmission line in the filter pass band and a high impedance outside the filter pass band.

Figure 2:
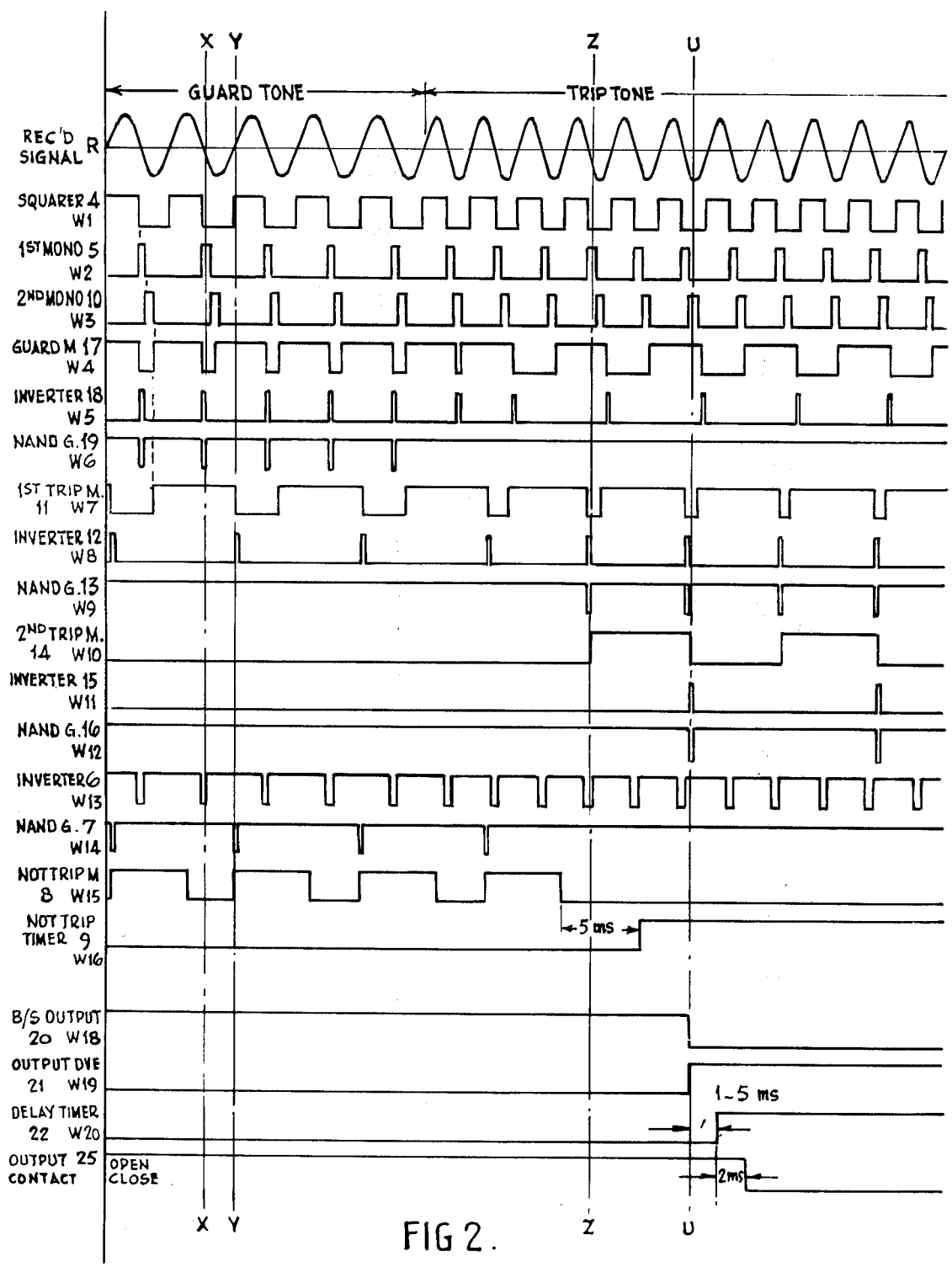
FIG. 2 is a set of waveforms illustrating the operation of the receiver.

Waveform R in FIG. 2 shows the guard frequency present initially followed by a period of transmission of the trip frequency.

The output of the filter 1 is fed via a variable attenuator 2 to an amplifier 3, the attenuator being set to provide a signal of predetermined level at the amplifier input. The amplifier output is fed to a squarer 4 whose output consists of a train of positive-going pulses (W1 in FIG. 2) whose leading and trailing edges correspond respectively to the positive-going and negative-going zero cross-overs in the received signal.

The output of the squarer 4 is applied to a differentiating circuit C1, R1 whose output is utilised to trigger a monostable circuit 5. The circuit 5 produces a positive-going pulse having a duration which is short compared with the duration of each half cycle of the trip frequency in response to each negative-going output pulse of the differentiating circuit C1, R1, which negative-going pulses correspond to the trailing edges of the pulses at the output of the squarer 4.

The output of the monostable circuit 5 is applied to a differentiating circuit C2, R2 whose output is utilised to trigger a monostable circuit 10 which produces a positive-going pulse having a duration which is short compared with the duration of each half-cycle of the trip frequency in response to each negative-going output pulse of the differentiating circuit C2, R2.

Thus the stages of the receiver so far described produce first and second trains of pulses (W2 and W3 in FIG. 2) at a repetition frequency equal to the frequency of the received signal, the pulses in the two trains being non-coincident. For the purpose explained below, the time constants of the monostable circuit 5 and 10 are adjustable so that the duration of the pulses in the two trains can be independently varied.

The output of the monostable circuit 10 is applied to a pair of frequency recognition circuits FRG and FRT to determine whether the pulse train produced by the monostable circuit 10, and hence the received signal, is at the guard or trip frequency.

In the circuit FRG the output of the monostable circuit 10 is applied to a differentiating circuit C6, R6 whose negative-going output pulses are utilised to trigger a guard monostable circuit 17 to produce a succession of positive-going pulses as shown at W4 in FIG. 2. The output of the monostable circuit 17 is applied to a differentiating circuit C7, R7 whose output pulses are applied to an inverter 18 which responds to the negative-going pulses in this output giving an output (W5 in FIG. 2) which is applied to one input of a NAND gate 19, hereinafter called the guard gate. The train of pulses at the output of the monostable circuit 5 is applied to the other input of the guard gate 19 and the duration of the pulses produced by the monostable circuit 17 is adjusted so that the pulses at the output of the inverter 18 coincide with the pulses produced by the monostable circuit 5 only when the monostable circuit 5 pulses have a frequency within a narrow band centred on the guard frequency. Hence negative-going pulses (W6 in FIG. 2) are produced by the circuit FRG at the output of the guard gate 19, as at X—X in FIG. 2, only when the received signal is in a narrow band centred on the guard frequency, the recognition band of the circuit FRG being determined by the duration of the pulses at the output of monostable circuit 5.

It will be appreciated that the components C6, R6, 17, C7, R7, and 18 effectively constitute a delay circuit which in response to output pulses of the monostable circuit 5 produces corresponding output pulses at a delay determined by the period of the monostable circuit 17.

The frequency recognition circuit FRT effectively comprises a delay circuit comprising two series-connected delay circuits of the same general form as the delay circuit of circuit FRG.

Thus, in the circuit FRT, the output of the monostable circuit 10 is applied to a differentiating circuit C3, R3 whose negative-going output pulses are utilised to trigger a first trip monostable circuit 11 to produce a succession of positive-going pulses (W7 in FIG. 2). The output of the monostable circuit 11 is applied to a differentiating circuit C4, R4 whose output pulses are applied to an inverter 12 which responds to the negative-going pulses in this output giving an output (W8 in FIG. 2) which is applied to one input of a NAND gate 13. The train of pulses at the output of the monostable circuit 5 is applied to the other input of the gate 13 and the duration of the pulses produced by the monostable circuit 11 is adjusted so that negative-going pulses (W9 in FIG. 2) are produced at the output of the gate 13, as at Z—Z in FIG. 2, only when the received signal is in a narrow band control on the trip frequency.

The output pulses of the gate 13 are utilised to trigger a second trip monostable circuit 14 to produce, when the trip frequency is being received, a succession of positive-going pulses (W10 in FIG. 2). The output of the monostable circuit 14 is applied to a differentiating circuit C5, R5 whose output pulses are applied to an inverter 15 which responds to the negative-going pulses in this output giving an output (W11 in FIG. 2) which is applied to one input of a three-input NAND gate 16, hereinafter called the trip gate.

The train of pulses at the output of the monostable circuit 10 is applied to a second input of the trip gate 16, and the duration of the pulses produced by the monostable circuit 14 is adjusted so that, when the gate 16 is not inhibited by its third input, negative-going pulses (W12 in FIG. 2) are produced at the output of gate 16, as at U—U in FIG. 2, when the received signal is in a narrow band centred on the trip frequency.

It will be appreciated that the recognition band of the circuit FRT is dependent on the duration of the pulses at the outputs of both monostable circuit 5 and monostable circuit 10. However, in practice, the pulses of monostable circuit 10 are made of shorter duration than the pulses of monostable circuit 5. Hence the recognition band of the circuit FRT i.e. the trip frequency recognition band is effectively determined by the pulses of monostable circuit 10.

Thus, the recognition bands of the circuits FRG and FRT may be set independently. In general the duration of the pulses produced by monostable circuit 5 is made relatively long to give a sufficiently wide guard frequency recognition band to ensure recognition in the presence of noise, and the duration of the pulses produced by the monostable circuit 10 is made relatively short to give a sufficiently narrow trip frequency recognition band to give good security against operation by interfering signals.

It will be appreciated that security can be increased by increasing the duration of the pulses produced by the monostable circuits 11 and 14 so that recognition of guard or trip frequency takes place over a larger number of cycles of the received signal, but this has the drawback that operating time is correspondingly increased.

The outputs of the trip and guard gates 16 and 19 are utilised to operate a bistable circuit 20 so that the bistable circuit assumes or remains in a first state in response to each output pulse of the guard gate 19 and assumes or remains in a second state in response to each output pulse of the trip gate 16, the first and second states being hereinafter referred to as the guard and trip states. Thus, as shown by waveform W18 in FIG. 2, the bistable circuit 20 assumes the guard state in normal operation while the guard frequency is being received, and assumes the trip state each time the trip frequency is received long enough for a pulse to appear at the output of the trip gate 16, remaining in the trip state until the guard frequency is again received for a period long enough for a pulse to appear at the output of the guard gate 19, and so on.

An output (W18 in FIG. 2) of the bistable circuit 20 is utilised via a drive circuit 21 and a delay timer 22 to control a relay 23, the drive circuit and delay timer outputs being shown at W19 and W20 in FIG. 2. The relay is thus operated when the bistable circuit assumes the trip state after a delay of between 1 and 5 milliseconds set by the delay timer, the relay being provided with a pair of contacts 25 which close 2 milliseconds after the output of the delay timer changes in response to the change of state of the bistable circuit 20 to initiate any operation which is required to occur on occurrence of a fault, e.g. tripping of a relay. The delay provided by the delay timer guard against operation of the relay 23 in response to temporary operation of the bistable circuit 20 in the presence of extreme interference signals. The longer the delay is made so the more secure against such maloperation becomes the receiver, but the operating time also increases so a compromise is made in choice of the delay of the timer 22.

To improve the security of the receiver further a Not trip frequency detector is also included in the receiver. To this end the output of the monostable circuit 5 is applied to an inverter 6 whose output (W13 in FIG. 2) is applied to one input of NAND gate 7, to whose other input the output of the inverter 12 is applied. The gate 7 thus produces a negative-going output pulse in response to each input pulse from the inverter 12 (as at Y—Y in FIG. 2) except when the received signal has a frequency within a narrow band centred on the trip frequency, the width of the band being determined by the duration of the pulses produced by the monostable circuit 5. The negative-going pulses produced by the gate 7 (W14 in FIG. 2) are utilised to trigger a monostable circuit 8 which thus provides a succession of pulses (W15 in FIG. 2), one for each output pulse of the gate 7. The output of the monostable circuit is applied to a Not trip timer 9 which provides an inhibiting voltage (W16 in FIG. 2) at the third input of the gate 16 from a time 0.5 milliseconds after the beginning of an output pulse of the monostable circuit 8 until 5 milliseconds after the end of such pulse.

Thus the trip gate 16 is positively prevented from producing output pulses until the trip frequency has been received for a short time. Further security to this end is obtained by utilising the output of timer 9 to clamp the bistable circuit 20 in its guard state.

It will be seen that by dividing the trip frequency recognition circuit FRT into two stages, the first of which has a relatively wide recognition band, and by making the Not trip frequency recognition band of corresponding width, the overall recognition band of the trip recognition circuit FRT is narrower than the Not trip recognition band. This enables a degree of frequency overshoot to occur during transistion of the received signal from guard to trip frequency without production of a Not trip inhibiting voltage by timer 9 and consequent delay in the operation of the bistable circuit 20 into its trip state.

It will further be seen that at each of the gates 13 and 19 the train of pulses W2 used to detect coincidence is different from the train of pulses W3 used to trigger the monostable circuit 11 or 17 supplying the other input of that gate. A similar remark applies in respect of the gate 16 since the pulses W9 which trigger the monostable circuit 14 coincide with pulses W2.

By this means the possibility of a monostable circuit 11, 14 or 17 being triggered at the same time as it returns to its stable state is avoided. However, in an arrangement in accordance with the invention this may be avoided in other ways, for example, by providing an appropriate monostable circuit with a blanking arrangement, e.g. by arranging for that monostable circuit to be incapable of being triggered until a suitable time after returning to its stable from its unstable state.

In one such arrangement the arrangement of FIG. 1 is modified by replacing the W2 input of gate 13 by an input of waveform W3. The monostable circuit 11 then requires to be provided with a blanking arrangement so that neither the monostable 11 itself, nor the monostable circuit 14, will be triggered while returning to its stable state. In this particular example the provision of a blanking arrangement has no operational disadvantage, but delay in operation of the receiver may result in certain circumstances.

A method of avoiding this difficulty in the circuit FRT without the use of a blanking arrangement is to arrange for the trip frequency measurement performed by components 11 to 13 to occur over a different number of cycles of trip frequency from the measurement performed by components 14 to 16.

In a further modification of the arrangement of FIG. 1, the W2 input of gate 13 is changed over with the W3 input of gate 16. This has the advantage that more frequent pulses are obtained at the output of the trip gate 16 when the trip frequency is received. With this arrangement the W2 input of inverter 6 has to be replaced by an input of waveform W3 since, when the trip frequency is being received, the pulses of waveform W8 will now coincide with the pulses of waveform W3, and not those waveform W2 as previously.

It is pointed out that, for simplicity, it is assumed in the above description that the trip frequency is transmitted continuously under fault conditions. In practice the trip and guard frequencies are normally transmitted alternately under fault conditions e.g. for periods of 29 milliseconds and 80 milliseconds respectively, and a receiver will accordingly include further circuits which make use of this form of signal to prevent maloperation. Examples of such further circuits is described in United Kingdom Patent No. 1,236,544.

To detect the presence of an unwanted (i.e. false) signal of trip frequency in the received signal a high sensitivity trip frequency detector 24 fed from the attenuator 2 may be provided. If a signal of trip frequency is received for a time (e.g. 5 seconds) far in excess of the time which the receiver takes to recognise a true trip frequency signal, the detector 24 closes a pair of contacts 26 to operate an alarm, and clamps the bistable circuit 20 in the guard state. The detector 24 is required because, if during the reception of an unwanted signal of trip frequency, i.e. when a signal of guard frequency is being received, a fault occurs and the guard frequency is removed, maloperation of the receiver may occur.

I claim:

1. A receiver for use in a signalling system of the kind wherein data is conveyed by transmitting a signal having alternately first and second frequencies comprising: shaping and squaring circuitry which provides in response to the received signal first and second trains of pulses, the two trains having frequencies correspondingly dependent on the frequency of the received signal and the durations of the pulses in each being independent of the durations of the pulses in the other train and small compared with the period of the received signal; a first delay circuit fed with one of said trains of pulses; a second delay circuit fed with one of said trains of pulses; a first coincidence gate circuit having as inputs the output of the first delay circuit and said first train of pulses; and a second coincidence gate circuit having as inputs the output of said second delay circuit and said second train of pulses; the delays of the delay circuits being such that the first coincidence gate circuit produces an output substantially only when the received signal has its first frequency; and the second coincidence gate circuit produces an output substantially only when the received signal has its second frequency.

2. A receiver as claimed in claim 1 wherein the pulses constituting one of said first and second trains of pulses have a greater duration than those pulses constituting the other train of pulses.

3. A receiver as claimed in claim 2 wherein at least one of the delay circuits comprises first and second component delay circuits connected via an intermediate coincidence gate circuit, the first component delay circuit being fed with one of said trains of pulses, the intermediate coincidence gate circuit having as inputs the output of said first component delay circuit and one of said trains of pulses, and the second component delay circuit being fed with the output of said intermediate coincidence gate circuit, the output of the second component delay circuit constituting the output of the delay circuit as a whole.

4. A receiver as claimed in claim 3 wherein the train of pulses supplied to the coincidence gate circuit connected to the output of a delay circuit having first and second component delay circuits is the train of pulses having the shorter duration, and the train of pulses supplied to the associated intermediate coincidence gate circuit is the train of pulses having the longer duration.

5. A receiver as claimed in claim 4 wherein at least one of said first and second coincidence gate circuits has as an additional input a signal which inhibits the output of that coincidence gate circuit, and which is removed after a predetermined period from the commencement of a period in which the received signal has the frequency at which that gate circuit would otherwise produce an output.

6. A receiver according to claim 5 wherein said signal which inhibits the output of the coincidence gate circuit is derived from the output of the associated first component delay circuit.

7. A receiver as claimed in claim 1 wherein at least one delay circuit comprises a monostable circuit arranged to be triggered to its unstable state by the pulses fed to it; and a shaping circuit which produces an output pulse in response to the monostable returning to its stable state so that each pulse triggering said monostable circuit produces a corresponding pulse delayed by the period of the monostable circuit.

8. A receiver as claimed in claim 7 wherein said first and second trains of pulses are non-coincident, and in respect of each delay circuit, the train of pulses used to trigger the monostable circuit of that delay circuit is different from the train of pulses applied to the coincidence gate circuit whose other input is derived from the output of that delay circuit.

9. A receiver as claimed in claim 1 wherein said first train of pulses is produced by a first monostable circuit triggered by the received signal, and said second train of pulses is produced by a second monostable circuit triggered by the trailing edges of the pulses of the first train of pulses.

10. A receiver as claimed in claim 1 wherein said first and second delay circuits are fed with the same train of pulses.

11. A receiver as claimed in claim 1 wherein the outputs of said first and second coincidence gate circuits provide the inputs of a bistable circuit so that the bistable circuit assumes or remains in one output state in response to an output from the first coincidence gate circuit and assumes or remains in a second output state in response to an output from the second coincidence gate.

* * * * *